Sept. 7, 1943. A. H. TINNERMAN 2,328,757
PANEL MOUNTING AND FASTENER THEREFOR
Filed Dec. 30, 1940
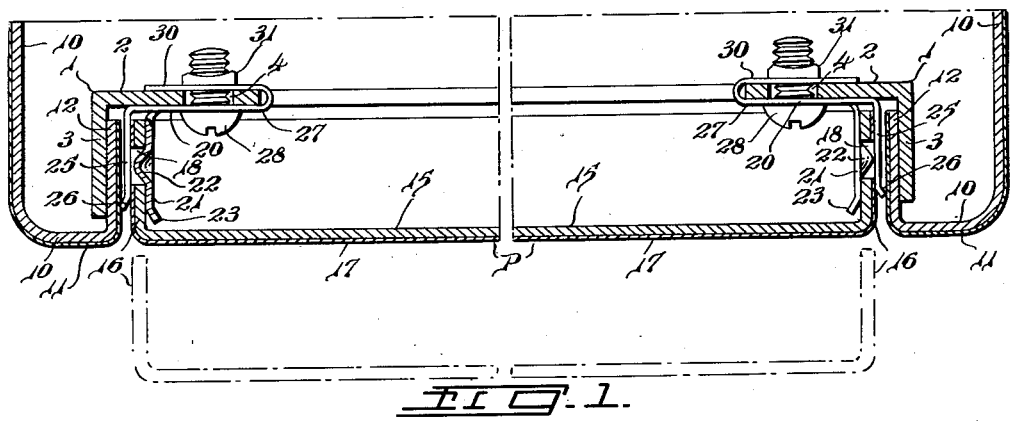
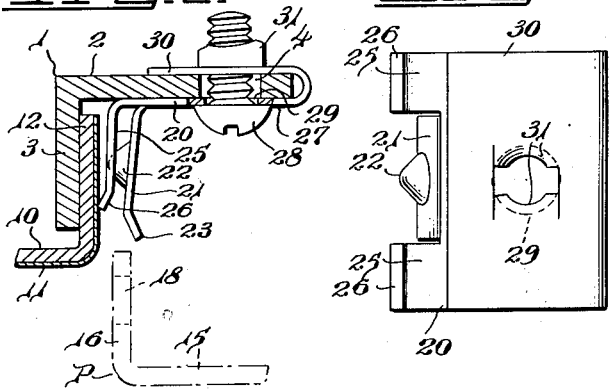
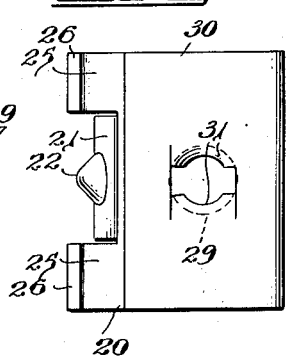
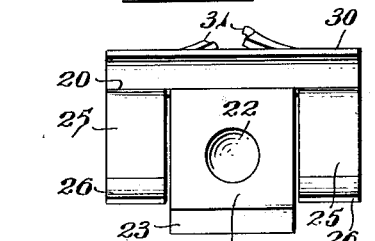
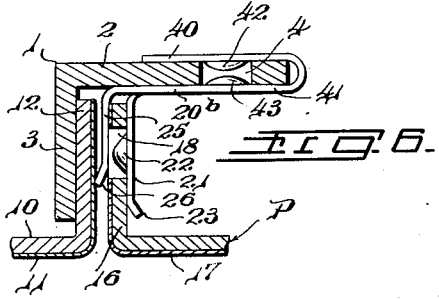
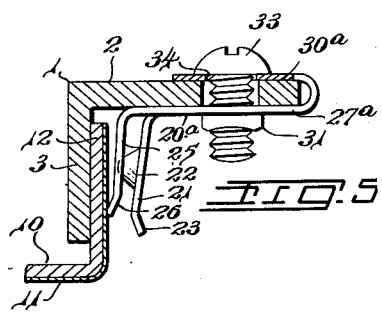
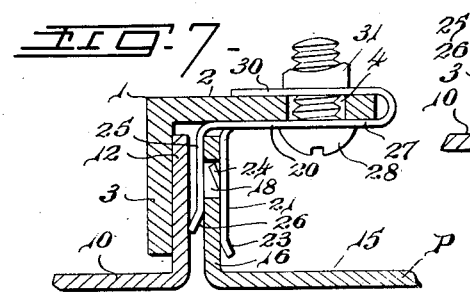
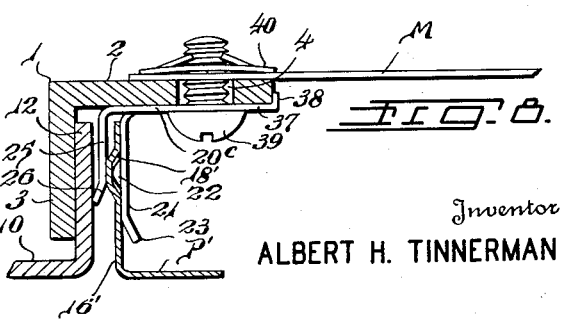
Inventor
ALBERT H. TINNERMAN
By H. G. Lombard
Attorney Patented Sept. 7, 1943

2,328,757

UNITED STATES PATENT OFFICE 2,328,757

PANEL MOUNTING AND FASTENER THEREFOR

Albert H. Tinnerman, Cleveland, Ohio, assignor to Tinnerman Products, Inc., Cleveland, Ohio, a corporation of Ohio Application December 30, 1940, Serial No. 372,429

3 Claims. (Cl. 189—35)

This invention relates in general to panel mountings and joint constructions provided therefor in the fabrication of sheet metal structures such as ranges and various cabinet constructions, and the like.

The principles of the present invention find particular application in structures wherein a panel serving as a cover or closure plate, or the like, must be firmly and rigidly secured against accidental displacement and disassociation from the supporting structure and yet capable of being readily removed to permit inspection and adjustment of working parts normally concealed thereby. In a gas range structure, for example, such a panel may assume the form of a manifold cover which conceals the manifold and associated burner valves and preferably forms a portion of the exterior surface of the range from which the panel may be readily removed for adjusting the valves, etc.

In similar and related installations, the panel may be provided in various forms for different applications and uses in the manner of a removable cover plate or closure for service openings in structures wherein it is necessary or desirable to provide for quick and easy access to a normally concealed operating mechanism for inspecting or adjusting purposes, or otherwise repairing or replacing a damaged part of such operating mechanism.

A primary object of the invention, therefore, is to provide a panel mounting and panel joint construction of this character comprising a fastener provided with combined securing and attaching means, the securing means being engageable with a flange of the panel in the manner of a snap fastener for removably retaining the panel in mounted position in cooperation with the attaching means designed to be attached to the main or supporting structure in an inconspicuous position and otherwise concealed by the panel in the applied mounted position thereof on the supporting structure.

Various panel mountings embody a panel having an enamelled finished surface and if secured by a conventional, rigid threaded nut and bolt, undue stresses and strains are set up in the assembly often resulting in objectionable cracking or chipping of such enamelled surface which, of course, mars the appearance of the finished product.

While cracking and chipping of the enamelled finish surface of a panel often is not apparent at the time the structure is assembled and sold to the consumer, it quickly becomes noticeable after a period of use, especially in a range construction which is subjected to heat causing an expansion and contraction of the parts of the assembly under alternate conditions of heating and cooling. Such expansion and contraction naturally causes damaging stresses and strains to be transmitted to the areas of the panels secured to the supporting structure and if the panel is mounted by rigid, non-yielding bolt fastenings, there frequently occurs a chipping, checking and crazing of the enamelled surface in such areas which gradually spreads to adjacent areas of the panel exposed to view with the result that the panel becomes unsightly and must be replaced. This objectionable cracking and chipping of the enamel does not involve only the cost of replacing a damaged panel, but also, the problem of matching the color thereof to correspond with that of the remaining structure which naturally becomes dull and faded after a period of use.

Another primary object of the invention, therefore, is to provide a panel joint construction comprising a fastener having resilient securing means for firmly mounting a removable panel without damaging mechanical pressure in the joint either during mounting thereof in an assembly or incidental to stresses and strains in the connected parts of the assembly taking place, for example, under alternate conditions of expansion and contraction during use.

A further object is to provide a joint construction for enamelled panels, and the like, by which such panels are securely held in operative position while providing for relative movement between the connected parts to compensate for inaccuracies and manufacturing variations therein or to permit suitable relative movement of the parts in assembled relation to dampen undue stresses and strains set up in the joint and thereby minimize possibility of checking, crazing or cracking of the enamelled surface of a panel.

Another object is to provide in such a panel joint construction, a substantial clip securing device comprising a resilient gripping member engaging a connecting flange of the panel, or the like, to hold the same firmly in removable mounted position and capable of yielding as necessary to compensate for limited relative movement of the connected portions of the joint which otherwise would cause a cracking or chipping of the enamelled finish surface of the panel.

A further object of the invention is to provide a removable panel mounting embodying such resilient clip securing devices provided in various forms with attaching means for attaching the fastener to the main or supporting structure in an assembly in an inconspicuous, concealed position, and in a simple, inexpensive and expeditious manner to provide a reliable and durable panel mounting in which the panel is not subject to accidental loosening, displacement or unintended removal in the normal operation and use of the assembly.

Further objects and advantages, and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a sectional view of an installation embodying the improved panel mounting of the invention;

Fig. 2 is a detailed sectional view showing one of the fasteners in Fig. 1 as attached to the supporting structure prior to the mounting of the panel;

Fig. 3 is a top plan view of the fastener per se shown in Fig. 3;

Fig. 4 is a side view of the fastener looking from the left of Fig. 3;

Fig. 5 is a sectional view similar to Fig. 2 showing an alternate form of the fastener;

Fig. 6 is a sectional view of a joint comprising another embodiment of the invention;

Fig. 7 is a sectional view showing a modification of the securing means of the fastener of Fig. 2; and, Fig. 8 is a sectional view of a joint embodying a further form of the fastener and another arrangement for securing the connecting flange of a panel.

While the invention is illustrated and described in connection with a removable manifold panel mounting for a stove or range structure, it will be appreciated, however, that the invention is equally applicable to various other uses in the manner of a removable cover or closure panel for service openings, and the like, in similar and related types of installations embodying a cabinet, casing, or like structure.

Many of such structures are composed of enamelled or porcelain panels which involve a difficult problem in firmly and rigidly securing the same in a removable mounting and without placing the enamelled or porcelain finish surface thereof under such mechanical pressure as would cause chipping or cracking of such enamel either in the initial assembly thereof or after a period of use in a completed installation.

In a range construction, this problem is even more serious since under alternate conditions of heating and cooling, there is proportionate expansion and contraction causing relative movement in the interfitted enamelled parts of the structure, and if such parts are rigidly secured under mechanical pressure, as by a rigid, nonyielding bolt fastening connected directly thereto, cracking, chipping and crazing of the enamelled finish surfaces will inevitably follow.

Generally speaking, the present invention overcomes the foregoing objectionable features and disadvantages in the use of a fastener having spring clip securing means removably mounting the panel and otherwise resiliently retaining the same in mounted position without exerting any such mechanical force as would cause a cracking or chipping of the enamel or porcelain finish surface thereof. And thus, by incorporating in the removable panel mounting substantial spring clip fasteners comprising yieldable gripping elements resiliently engaging the panel and preferably at points removed from the exposed finish surface thereof, sufficient resiliency is provided in the several joints or connections of the panel mounting to avoid fracture of the surface of the panel as a result of strains set up either during the assembly or use of the range, or in dismounting and replacing the panel as often as necessary or desirable for servicing purposes, cleaning the manifold compartment, etc.

Referring now, more particularly to the drawing, Figure 1 illustrates in section the improved removable panel mounting of the invention provided, for example, as the cover or closure for a manifold compartment at the forward side of a range, or the like. The range is built upon an inner supporting frame structure provided by suitable L-shapes 1, angle irons, brackets, beams, or the like, defining spaced vertical supporting flanges 2 which are provided with apertures 4 for attaching thereto the fasteners for removably mounting the panel in the completed installation. The flanges 2, otherwise are provided to extend in substantial alignment in predetermined offset relation to the adjacent exterior surface of the range to define, what may be termed, rabbeted surface portions for receiving the associated end portions of a closure panel or cover and effectively conceal the mounting means therefor, as presently to be described.

The adjacent exterior surface comprises side panels 10 usually having a layer of enamel or porcelain 11, and provided with inturned flanges 12 which are suitably secured to the inner faces of the complementary flanges 3 of the L-shapes or angle irons 1 included in the supporting structure, as aforesaid. The said inturned flanges 12 of the side panels and the offset connecting flanges 2 of the L-shapes 1, thus define an opening accommodating the panel P in such a way that the outer body 15 thereof is in substantial alignment with or lies in the general contour of the adjacent exterior surfaces of the side panels 10 to provide an even and uniform appearance to the range or similar cabinet structure, or the like.

The panel P includes peripheral connecting flanges 16 extending rearwardly from the panel body 15, and a layer of porcelain or enamel 17 on the outer surface thereof matching or contrasting in any selected color scheme with the finish surfaces 11 of the side panels 10. Said rearwardly extending connecting flanges 16 are provided with retaining recesses 18, or the like, adapted to cooperate with the securing means of the fastener, and otherwise are designed to be received in the open area bounded by the inturned flanges 12 of the side panels 10, with a slight spacing therefrom, substantially as shown in Figure 1.

Thus, in the mounted position of the panel P, the rearwardly extending connecting flanges 16 thereof are disposed generally normal to the connecting flange 2 of the supporting structure and in slightly spaced, juxtaposed relation to the adjacent flanges 12 of the side panels. This slightly spaced relation of the adjacent flanges 12, 16, eliminates any such mechanical pressure therebetween which would damage the immediate portions of the enamelled or porcelain finish surfaces 11, 17, thereof, respectively and in order to ensure this condition in the mounted position of the panel, resilient spacer means are included in the securing portions of fasteners designed for snap fastening engagement with the connecting flanges 16 of the panel P in cooperation with means for attaching the fasteners to the vertically extending flanges 2 of the supporting structure.

The panel P thereby may be mounted by applying the rearwardly extending connecting flanges 16 thereof to the associated securing portions of the fasteners without damaging mechanical pressure on the enamelled surface 17 thereof and without affecting the adjacent enamelled surfaces 11 of the inturned flanges 12 of the complementary side panels 10. The arrangement otherwise is such that the fasteners provide a panel mounting embodying a plurality of cooperating joints which are rigid and secure and yet sufficiently resilient to allow the necessary slight degree of relative movement between adjacent portions of the panels incidental to expansion and contraction resulting from alternate conditions of heating and cooling.

A preferred form of the fastener just described comprises a simple, double-ended clip device which may be inexpensively constructed in one piece from a relatively small body of any suitable sheet metal, preferably spring metal such as spring steel or cold rolled steel having spring-like characteristics. Broadly described, the sheet metal body is formed to provide a fastener comprising a panel securing portion at one end extending generally at right angles to an attaching portion provided from the other end thereof. While the fastener may be provided from blanks of various outlines, the same is manufactured in most economical quantity production from a simple, rectangular sheet metal section of uniform width which may be obtained at very low cost from ordinary sheet metal strip stock with little or no loss or waste of material.

As best seen in Figures 2-4 inclusive, one end of the spring metal blank or other sheet metal body 20 is slit longitudinally to provide the securing portion of the fastener comprising two or more, preferably three, substantial fingers designed to cooperate in engaging opposite faces of the associated connecting flange 16 on the panel to be mounted. Finger 21 is provided with an inwardly projecting detent or retaining lug 22 formed in any suitable way, and the finger otherwise bent outwardly generally perpendicular to one side of the sheet metal body 20 to define a latching finger adapted to engage the inner face of the panel connecting flange 16 with said detent 22 receivable in the retaining recess 18 in said flange by substantial snap fastening action. Preferably, the free end of said finger 21 is flared outwardly to define an outwardly tapering lip element 23 which facilitates the initial application of the connecting flange thereto and otherwise permits a tool to be applied to said finger to disengage the detent 22 thereof from the panel connecting flange 16 for easily and quickly dismounting the panel.

Extending generally parallel and laterally spaced from the latching finger 21, one or preferably two cooperating fingers 25 on either side thereof are bent to project from the sheet metal body 20 in the same general direction as said latching finger 21 but in laterally offset relation thereto for engaging the outer face of the panel connecting flange 16 in cooperation with the latching finger 21 engaging the inner face thereof. Preferably the free ends of said fingers 25 are bent outwardly therefrom to provide tapering lip elements 26 which cooperate with lip element 23 on the latching finger 21 to define a flared entering space therebetween for receiving readily the leading edge of the connecting flange of the panel 16 on being applied thereto, substantially as represented by broken lines in Figure 2.

With the securing portion of the fastener thus provided, the attaching portion is formed from the remainder of the body 20 to extend generally at right angles to said securing portion for attachment to the flange 2 of the supporting structure. Such attaching means may be provided in various ways and a preferred construction for exceptional strength and durability is shown comprising a spring arm 30 formed by a return bent portion of the sheet metal body 20 on the side thereof opposite the side from which the securing fingers 21, 25 extend. The attaching portion of the fastener thus assumes the form of a substantial U-shape comprising a gripping arm 27 defined by the body portion 20, and an integral cooperating spring arm 30. Said arms 27, 30, preferably are so spaced as to receive the flange 2 in frictional gripping relation therewith and are provided with aligned bolt passages which register with the aperture 4 in the supporting part 2 for receiving a bolt or screw fastening 28 adapted to threadedly engage a nut or equivalent means on the spring arm 30. The bolt passage 29 in the arm 27 is a simple bolt opening freely receiving said bolt fastening 28 while the passage in the cooperating spring arm 30 preferably is formed to include integral bolt thread engaging means with which the bolt 28 may be threadedly engaged and tightened by an easy and quick operation entirely from the side of the bolt is applied, without requiring access to the reverse side as would be necessary in using a separate conventional threaded nut and holding the same against movement when the bolt is applied thereto and turned to tightened fastening position.

While equivalent bolt thread engaging means may be provided in the manner of a separate threaded nut spot-welded, riveted or otherwise united to the spring arm 30 of the fastener, such arrangements are relatively expensive and make the cost of the fasteners prohibitive in many cases, because of the added step in manufacture which is required in addition to a separate assembling operation and the cost of a lock nut or lock washer for providing the bolt or screw with means preventing loosening or displacement thereof from tightened fastening position.

In the preferred construction shown, the above noted objections are obviated and most advantageously eliminated in the provision of the fastener in a unitary, inexpensive, one-piece, sheet metal product in which thread engaging means for the bolt are provided on the spring arm 30 in the manner of integral cooperating tongue elements 31, or the like, forming a thread or a thread opening for threadedly engaging the thread of the bolt 28, as illustrated in Figs. 1 and 2. Referring to Figures 3 and 4, it will be understood, more particularly, that such thread engaging elements 31 are best provided from the sheet metal material of the spring arm 30 by an aperture intermediate spaced parallel slits which form cooperating substantial tongues having spaced extremities defining the desired thread or thread opening corresponding substantially to the root diameter of the bolt or screw for threadedly engaging the thread thereof. Said tongue elements 31 otherwise are preferably formed to project outwardly of said spring arm 30 out of the plane thereof, as shown in Figure 4, and are bent intermediate their lengths in substantial ogee formation to provide for the maximum strength obtainable to withstand the tightening action of the bolt as it is advanced to final applied fastening position.

Such thread engaging means may be pressed, stamped, extruded or otherwise provided on the fastener in any suitable form or construction so long as the same threadedly engage with the thread of the bolt or screw 28 and, in this relation, the present invention fully contemplates the provision of such thread engaging means in various other similar and related forms, as in the manner of a substantial perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues 31, as shown, are the most efficient and the most practical in that they are possessed of unusual inherent strength and will not collapse or pull through when the bolt 28 is tightened, nor loosen under continuous strain and vibration in the installation. This takes place by reason of the fact that the sheet metal material from which such tongues are formed is of less thickness than the pitch or spacing between adjacent thread convolutions of the bolt or screw, wherefore the extremities of said tongues tend, more effectively, to move toward each other and dig into the grooves intermediate adjacent thread convolutions when tightened therewith and otherwise become embedded in the root diameter of the bolt in locked, frictional fastening engagement therewith in applied fastening position. Thus, in the present example, the tongues 31 are shown as extending out of the plane of arm 30 in substantial ogee formation and provided preferably with notched extremities, Figure 3, forming substantial biting jaws designed to cut into the root diameter of the bolt and adjacent thread surfaces thereon in positive locking relation therewith in the most effective manner. There is thereby eliminated the necessity for a separate, auxiliary locking means such as a lock nut or lock washer and this, in mass production, makes possible a considerable saving not only in the cost of such locking devices, but also, in the expense and labor involved in the tedious, time consuming assembling operations and other added steps in manufacture which such auxiliary locking means require. It is to be understood, however, that the present invention is not limited in any manner or form to the illustrated construction of the thread engaging means but rather, comprehends also, various other similar and related forms of such tongues or equivalent thread engaging elements.

In completing the desired panel mounting with the respective parts provided substantially in the manner aforesaid, the supporting structure 2 is provided with preperforated apertures 4 for attaching thereto as many fasteners as are necessary or desirable depending on the size of the panel and the strength required in the mounting. Inasmuch as the attaching portion of each fastener, provided by cooperating arms 27, 30, is disposed generally at right angles to the securing portion composed of the spaced spring fingers 21, 25, the fasteners are shaped to conform generally to the rabbeted surface portions defined by the supporting flanges 2 and the inturned flanges 12 of the adjacent panels 10. The fasteners are attached by spreading the spring arm 30 from arm 27 as necessary to slip the same over the edge of the associated supporting flange 2 to a position in which the thread engaging means 31 registers with the bolt passage 4 therein and the fingers 25 of the securing portion of the fastener extend along the inturned flange 12 of the adjacent panel structure. By designing the cooperating arm 27, 30 for substantial clipping engagement with the associated supporting flange 2, an important advantage is obtained in that the fasteners are self-sustaining in applied position by the spring-like characteristics of the metal so that unnecessary precaution need not be taken to prevent the fasteners from falling off when all are initially assembled on the supporting structure and the respective bolt fastenings 28 therefor subsequently applied to retain the same in permanently attached position thereon.

The panel P, having its rearwardly extending connecting flanges 16 provided with preformed recesses 18 corresponding to the location of the fasteners and the locking detents 22 thereof, may then be easily and quickly applied to mounted position by entering the leading ends of said flanges 16 between the flared lip elements 23, 26 of the securing fingers 21, 25, respectively, to gradually spread the same apart. As the panel is pushed inwardly, the leading ends of said flanges 16 cam against the forward inclined surfaces of the detents 22 to force the associated latching fingers 21 outwardly as necessary to permit said flanges 16 to be advanced to the final, mounted position of the panel, whereupon said detents snap into the recesses 18 to automatically seat therein and lock the connecting flanges 16 in such mounted position of the panel.

In this relation, the fingers 25 serve as resilient spacer means between the juxtaposed panel flanges 12, 16, to eliminate any such mechanical pressure therebetween which would damage the adjacent enamelled or porcelain finish surfaces 11, 17, thereof, respectively, either during the mounting or dismounting of the panel P or incidental to stresses and strains set up in the connected parts of the assembly taking place, for example, under alternate conditions of heating and cooling during use.

Removal of the panel P from mounted position may be effected by applying suitable force on the latching finger 21 of a fastener to cause the detent thereon to disengage from the recess 18 in the connecting flange 16 and permit the same to be withdrawn. This may be accomplished by wedging the panel from mounted position to cause the wall of recess 18 in the flange thereof to cam against the adjacent rearward inclined surface of said detent 22 and gradually clear the same in more or less a reversal of the action described as taking place in the mounting of the panel. Dismounting of the panel also may be performed, in any embodiment of the invention, by applying a suitable tool to the latching finger 21 either from where access thereto may be had from the interior of the range, or through small inconspicuous openings in the panel body 15 in a manner whereby the latching finger may be forced outwardly to disengage the detent 22 from the recess 18 and permit the associated connecting flange 16 to be withdrawn from secured relation with the fastener.

Figure 5 shows an alternate form of the fastener which has the same application and use as that just described and is similarly constructed except in the means for attaching the same to the flange 2 of the supporting structure. In some instances, it is necessary or desirable to apply the bolt fastening 33, Fig. 5, from the rearward side of the supporting flange 2 in expediting a certain preferred method of assembling an installation. Accordingly, the spring arm 30ᵃ is then provided with a simple bolt passage 34 while the cooperating arm 27ᵃ, defined by the fastener body 20ᵃ, is designed to include suitable thread engaging means such as integral tongue elements 31, or the like, substantially as shown and described with reference to Figs. 2-4, inclusive.

Fig. 6 illustrates another embodiment of the invention in which the use of a bolt or screw for attaching the fastener is dispensed with through the provision of an attaching portion designed for a locking, clip fastening action with the supporting flange 2. The spring arm 40 and cooperating arm 41, defined by the fastener body 20ᵇ, are designed for frictional and gripping relation with the supporting flange 2; and, in order to lock the same in such relation, either or both of said arms are provided with cooperating detents or similar lug elements, 42, 43, which are snugly received in the aperture 4 to lock the fastener in attached position. The arrangement is such that the arms 40, 41, must be forced apart over the edge of the flange 2 as necessary to permit the detents 42, 43 to snap into the aperture 4, as the loop or connecting portion between said arms engages the edge of the flange to prevent shifting or displacement of the fastener from its proper attached position while otherwise locked to the flange by the detents 42, 43, as aforesaid.

Fig. 7 discloses a modified form of the fastener of Figs. 1-4, inclusive, wherein the latching finger 21 is adapted for positively locking the panel connecting flange 16 in mounted position by a construction which may also be embodied in the similar clip securing portion of any of the other forms of the fastener. The latching detent in this instance is an integral lug element 24 which is struck from the latching finger 21 in a manner whereby the free end thereof defines a relatively sharp abutment which is received in the recess 18 to engage positively the wall thereof and thereby prevent withdrawal of the panel connecting flange 16 from mounted position. The arrangement otherwise is such that the detent 24 is inclined in such a way that the leading end of the panel flange 16 may be initially applied between the securing fingers 21, 25 in the usual manner to cam against the inclined surface of the detent 24 and gradually force the same outwardly as necessary to permit said flange to be advanced to the mounted position of the panel, whereupon the detent is adapted to snap into the recess 18 with the free end thereof positively abutting the adjacent wall of said recess to prevent withdrawal of the panel from applied mounted position, as aforesaid.

Fig. 8 represents another modification in which the securing portion of the fastener, comprising resilient spring fingers 21, 25 similar to the form described with reference to Figs. 1-4, inclusive, is shown retaining a panel P' having a connecting flange 16' provided with an imperforate recess 18' defined by a depression or small bend or groove on the inner face of such connecting flange. The fastener itself may be provided in a somewhat cheaper construction by employing only a single attaching arm 37, defined by the fastener body 20ᶜ, and provided with a positioning lip 38, if desired, adapted to engage the end of the supporting flange 2 to readily locate the fastener in proper position and otherwise prevent turning thereof as a bolt fastening is applied to secure the same in attached position. Integral bolt thread engaging means may be provided on said attaching arm 37 for securing the same to the supporting flange 2 in the manner of Fig. 5, or the same otherwise provided with a simple passage for a bolt fastening 39 threadedly engaging a separate nut member, such as sheet metal spring nut 40, provided with integral tongue elements, or the like, similar to the kind described with reference to Figs. 2-4, inclusive; in this relation, such a separate nut member 40 may advantageously serve the dual purpose of retaining the fastener 20ᶜ in attached position and securing an additional part or member M within the completed structure, substantially as shown.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. The combination with a support of a panel having an inturned flange, a pair of spring fingers carried by the support projecting toward the panel and spaced apart to receive the panel flange between them, said panel flange having a recess and one of the fingers having a projection adapted to enter the recess, one of the fingers being bent outwardly at its end to form an inclined guide for the entering panel flanges, and means engaging such outward bend and limiting the movement of that finger.

2. The combination of a structure formed with a recess and a supporting flange behind the recess, a panel adapted to extend across the open face of the recess and having a flange adapted to extend into the recess toward said supporting flange, a pair of spring retaining fingers carried by the supporting flange and projecting toward the panel and spaced apart to receive the panel-flange between them, one of said fingers having a projection adapted to enter an opening in the panel flange and the other finger near its free end bearing against a portion of the structure to limit movement of that finger away from the panel flange.

3. A joint of the class described, comprising a part having a supporting flange, a cooperating part having a connecting flange provided with a recess and extending toward said supporting flange in generally normal or other angular relation thereto, a member bordering said connecting flange, and a fastener connecting said flanges comprising a sheet metal body having a bend defining an attaching portion for attaching the fastener to said supporting flange, and a resilient securing portion comprising a pair of spaced elements resiliently retaining said connecting flange of the cooperating part, one of said elements being provided with a detent having snap fastening engagement in said recess in the connecting flange and the other being disposed between said connecting flange and bordering member and having its end portion bent at an acute angle into engagement with said bordering member.

ALBERT H. TINNERMAN.